US012753922B2

(12) United States Patent
Binek et al.

(10) Patent No.: US 12,753,922 B2
(45) Date of Patent: Oct. 6, 2026

(54) TURBINE ENGINE FUEL INJECTOR WITH NON-CIRCULAR NOZZLE PASSAGE

(71) Applicant: Raytheon Technologies Corporation, Farmington, CT (US)

(72) Inventors: Lawrence A. Binek, Glastonbury, CT (US); Sean R. Jackson, Palm City, FL (US); Timothy S. Snyder, Glastonbury, CT (US); Anthony Van, Palm City, FL (US); Randolph T. Lyda, Tequesta, FL (US); Brandon P. Williams, Johnston, IA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/221,222

(22) Filed: Apr. 2, 2021

(65) Prior Publication Data

US 2022/0316400 A1 Oct. 6, 2022

(51) Int. Cl.

*F23R 3/28* (2006.01)
*B33Y 80/00* (2015.01)
*B33Y 10/00* (2015.01)

(52) U.S. Cl.

CPC ................ *F23R 3/28* (2013.01); *B33Y 80/00* (2014.12); *F23R 3/286* (2013.01); *B33Y 10/00* (2014.12);

(Continued)

(58) Field of Classification Search

CPC ........ F23R 3/28-38; F23R 3/045; F23R 3/06; F23R 3/54; F23R 2900/03343;

(Continued)

(56) References Cited

U.S. PATENT DOCUMENTS 4,891,936 A * 1/1990 Shekleton ................. F23R 3/04 60/746
4,967,563 A * 11/1990 Shekleton ............... F23R 3/045 60/743

(Continued)

FOREIGN PATENT DOCUMENTS

CN 112484076 A * 3/2021 .............. F23R 3/286
EP 4198280 A1 6/2023

(Continued)

OTHER PUBLICATIONS

Idelchik, Handbook of Hydraulic Resistance: Coefficients of Local Resistance and Friction, translated to English in 1966 by the Israel Program for Scientific Translation, pursuant to agreement with U.S. Atomic Energy Commission and National Science Foundation, Washington D.C., IPST Cat No. 1505 (Year: 1966).*

(Continued)

*Primary Examiner* — Stephanie Sebasco Cheng

(74) *Attorney, Agent, or Firm* — Getz Balich LLC

(57) ABSTRACT

An apparatus is provided for a turbine engine. This turbine engine apparatus includes a fuel nozzle. The fuel nozzle includes a nozzle passage and a nozzle orifice. The nozzle passage extends longitudinally along a centerline within the fuel nozzle to the nozzle orifice. The nozzle passage has a solid polygonal cross-sectional geometry at the nozzle orifice.

17 Claims, 9 Drawing Sheets

(52) U.S. Cl.
CPC ...... *F05D 2230/31* (2013.01); *F05D 2240/36* (2013.01)

(58) Field of Classification Search
CPC ...... F23D 14/58; F23D 11/105; F23D 14/065; F23D 14/085; F23D 11/24–30; F23D 2900/14064; F23D 2900/31019; F23D 2900/14701; F23D 2900/14241; F23D 2900/14021; F23D 11/102; F23D 11/104; F23D 11/103; F23D 11/383; F23D 11/40; F23D 11/402; F23D 14/02; F23D 14/08; F23D 11/101–15; F23D 11/12–14; F23D 11/408; F05D 2230/30–314; F05D 2250/11–132; F02C 7/222
See application file for complete search history.

(56) References Cited

U.S. PATENT DOCUMENTS

| | | | | | |
|---|---|---|---|---|---|
| 5,241,818 | A * | 9/1993 | Shekleton | F23R 3/28 | 60/738 |
| 5,277,022 | A * | 1/1994 | Shekleton | F23R 3/32 | 60/737 |
| 5,727,378 | A * | 3/1998 | Seymour | F01D 25/125 | 60/738 |
| 6,931,862 | B2 * | 8/2005 | Harris | F23R 3/12 | 60/804 |
| 9,791,153 | B2 | 10/2017 | Dai | | |
| 9,803,498 | B2 * | 10/2017 | Jewess | F01D 15/10 | |
| 2011/0031333 | A1 * | 2/2011 | Short | F23R 3/28 | 239/548 |
| 2012/0181355 | A1 * | 7/2012 | Corry | F23R 3/28 | 239/436 |
| 2018/0216828 | A1 | 8/2018 | Johansson | | |
| 2020/0109859 | A1 | 4/2020 | Binek | | |
| 2020/0173662 | A1 | 6/2020 | Boehm | | |
| 2020/0182467 | A1 | 6/2020 | Binek | | |
| 2020/0191093 | A1 | 6/2020 | Boardman | | |
| 2020/0347728 | A1 | 11/2020 | Binek | | |
| 2020/0362724 | A1 | 11/2020 | Binek | | |
| 2023/0151966 | A1 * | 5/2023 | Dederichs | F23D 11/24 | 60/737 |

FOREIGN PATENT DOCUMENTS

| | | | | |
|---|---|---|---|---|
| JP | 2019100595 | A | * | 6/2019 |
| WO | WO-2022018119 | A1 | * | 1/2022 |

OTHER PUBLICATIONS

EP search report for EP22166587.0 dated Aug. 18, 2022.
EP Office Action issued in EP Patent Application No. 22166587.0 dated Nov. 15, 2023.

* cited by examiner

TURBINE ENGINE FUEL INJECTOR WITH NON-CIRCULAR NOZZLE PASSAGE

BACKGROUND OF THE DISCLOSURE

1. Technical Field

This disclosure relates generally to a turbine engine and, more particularly, to a fuel injector assembly for the turbine engine.

2. Background Information

A combustor section in a modern turbine engine includes one or more fuel injectors. Each fuel injector is operable to inject fuel for combustion within a combustion chamber. Various types and configurations of fuel injectors are known in the art. While these known fuel injectors have various benefits, there is still room in the art for improvement. There is a need in the art, for example, for a fuel injector with reduced manufacturing costs, that facilitates reduced assembly time as well as provides precision fuel injection.

SUMMARY OF THE DISCLOSURE

According to an aspect of the present disclosure, an apparatus is provided for a turbine engine. This turbine engine apparatus includes a fuel nozzle. The fuel nozzle includes a nozzle passage and a nozzle orifice. The nozzle passage extends longitudinally along a centerline within the fuel nozzle to the nozzle orifice. The nozzle passage has a solid polygonal cross-sectional geometry at the nozzle orifice.

According to another aspect of the present disclosure, a method of manufacturing is provided. During this manufacturing method, a fuel nozzle is additively manufactured. The additively manufacturing provides the fuel nozzle with a nozzle passage and a nozzle orifice. The nozzle passage extends longitudinally along a centerline within the fuel nozzle to the nozzle orifice. At least a first portion of the nozzle passage tapers inward towards the centerline as the nozzle passage extends longitudinally along the centerline towards the nozzle orifice. A slope of the taper has a rise to run ratio of less than 0.6.

According to still another aspect of the present disclosure, another method of manufacturing is provided. During this manufacturing method, a fuel nozzle is additively manufactured. The additively manufacturing provides the fuel nozzle with a nozzle passage and a nozzle orifice. The nozzle passage extends longitudinally along a centerline within the fuel nozzle to the nozzle orifice. The nozzle orifice has a lateral width less than 0.0223 inches.

The nozzle passage may have a non-annular, non-circular cross-sectional geometry at the nozzle orifice.

The nozzle passage may have a square or diamond shaped cross-sectional geometry at the nozzle orifice.

The solid polygonal cross-sectional geometry may have a diamond shape.

The solid polygonal cross-sectional geometry may have a square shape.

At least a first portion the nozzle passage may taper inward towards the centerline as the nozzle passage extends longitudinally along the centerline towards the nozzle orifice.

A slope of the taper may have a rise to run ratio of less than 0.6, 0.5 or 0.4.

At least a first portion of an exterior of the fuel nozzle may have a constant lateral width as the exterior of the fuel nozzle extends longitudinally along the centerline towards the nozzle orifice. The first portion of the exterior of the fuel nozzle may longitudinally overlap the first portion the nozzle passage along the centerline.

A second portion of the nozzle passage may be longitudinally between the first portion of the nozzle passage and the nozzle orifice along the centerline. The second portion of the nozzle passage may have a constant lateral width longitudinally along the centerline.

The first portion of the nozzle passage and the second portion of the nozzle passage may each have the solid polygonal cross-sectional geometry.

The first portion of the nozzle passage may be longitudinally between the nozzle orifice and a second portion of the nozzle passage along the centerline. The second portion of the nozzle passage may have a constant lateral width longitudinally along the centerline.

The first portion of the nozzle passage may have the solid polygonal cross-sectional geometry. The second portion of the nozzle passage may have a second cross-sectional geometry that is different than the solid polygonal cross-sectional geometry.

The solid polygonal cross-sectional geometry may extend along a longitudinal length of the nozzle passage.

The nozzle orifice may have a lateral width less than 0.0223 inches.

The fuel nozzle may have a tubular sidewall forming the nozzle passage. The tubular sidewall may have a minimum lateral width that is less than 0.01 inches.

The turbine engine apparatus may also include a fuel conduit fluidly coupled with the fuel nozzle. The fuel nozzle may be configured to receive fuel from the fuel conduit within the nozzle passage. The fuel nozzle may also be configured to direct the fuel out of the nozzle passage through the nozzle orifice.

The turbine engine apparatus may also include an air tube including an air passage. The fuel nozzle may project into the air passage. The fuel nozzle may be configured to direct fuel out of the nozzle passage through the nozzle orifice into the air passage.

The turbine engine apparatus may also include a combustor wall. The combustor wall may at least partially form a combustion chamber. The air tube may be connected to the combustor wall and may project into the combustion chamber.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
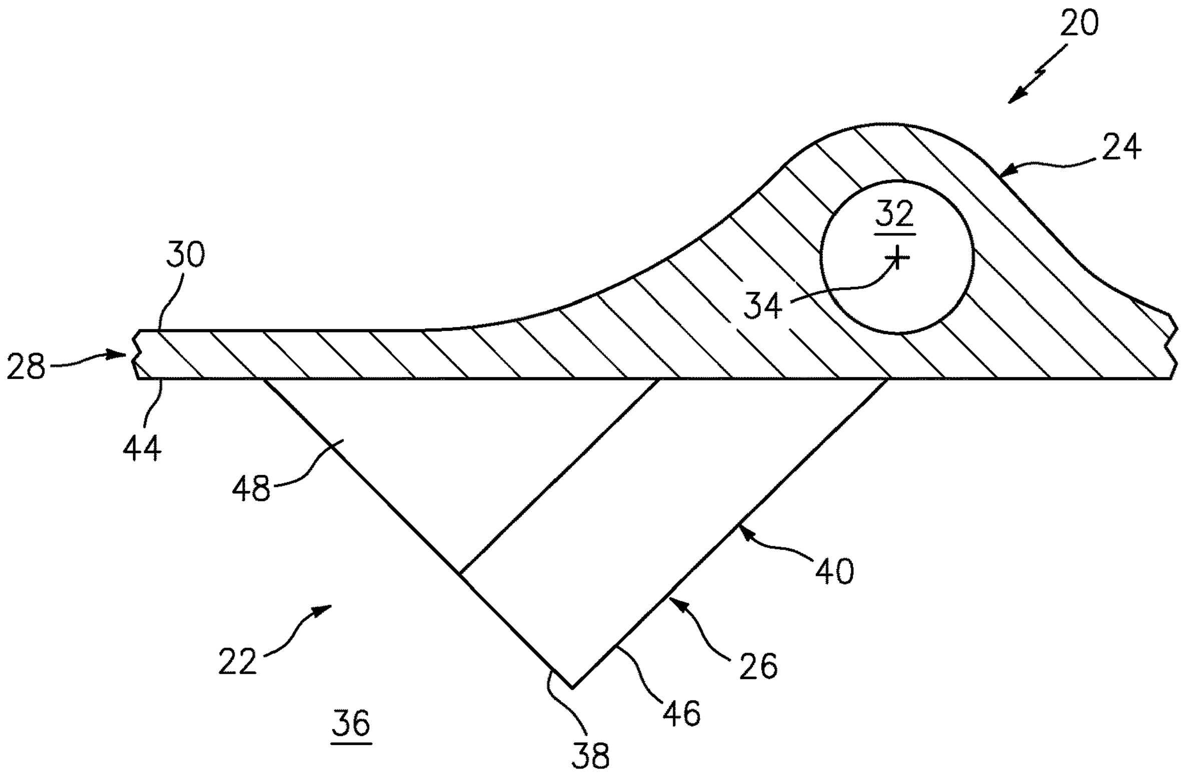
FIG. 1 is a side sectional illustration of a portion of a turbine engine apparatus next to a fuel nozzle.

FIG. 1 illustrates a portion of an apparatus 20 for a turbine engine. This turbine engine apparatus 20 is configured as, or otherwise includes, a fuel injector assembly 22 for a combustor section of the turbine engine. The turbine engine apparatus 20 includes a fuel conduit 24 and a fuel nozzle 26; e.g., a single and/or central orifice fuel nozzle. The turbine engine apparatus 20 of FIG. 1 may also include an apparatus base 28, which apparatus base 28 may provide a structural support for the fuel conduit 24 and/or the fuel nozzle 26.

The apparatus base 28 may be configured as any part of the turbine engine within the combustor section that is proximate the fuel injector assembly 22. The apparatus base 28 of FIG. 1, for example, may be configured as a turbine engine case such as, but not limited to, a combustor section case, a diffuser case and/or a combustor wall.

The fuel conduit 24 is configured as, or may be part of, a fuel supply for the fuel nozzle 26. The fuel conduit 24, for example, may be or may be part of a fuel supply tube, a fuel inlet manifold and/or a fuel distribution manifold. The fuel conduit 24 is arranged at and/or is connected to a first side 30 (e.g., an exterior and/or outer side) of the apparatus base 28. The fuel conduit 24 is configured with an internal fuel supply passage 32 formed by an internal aperture (e.g., a bore, channel, etc.) within the fuel conduit 24. The supply passage 32 and the associated aperture extend within and/or through the fuel conduit 24 along a (e.g., curved and/or straight) centerline 34 of the supply passage 32, which may also be a centerline of the fuel conduit 24.

Figure 2:
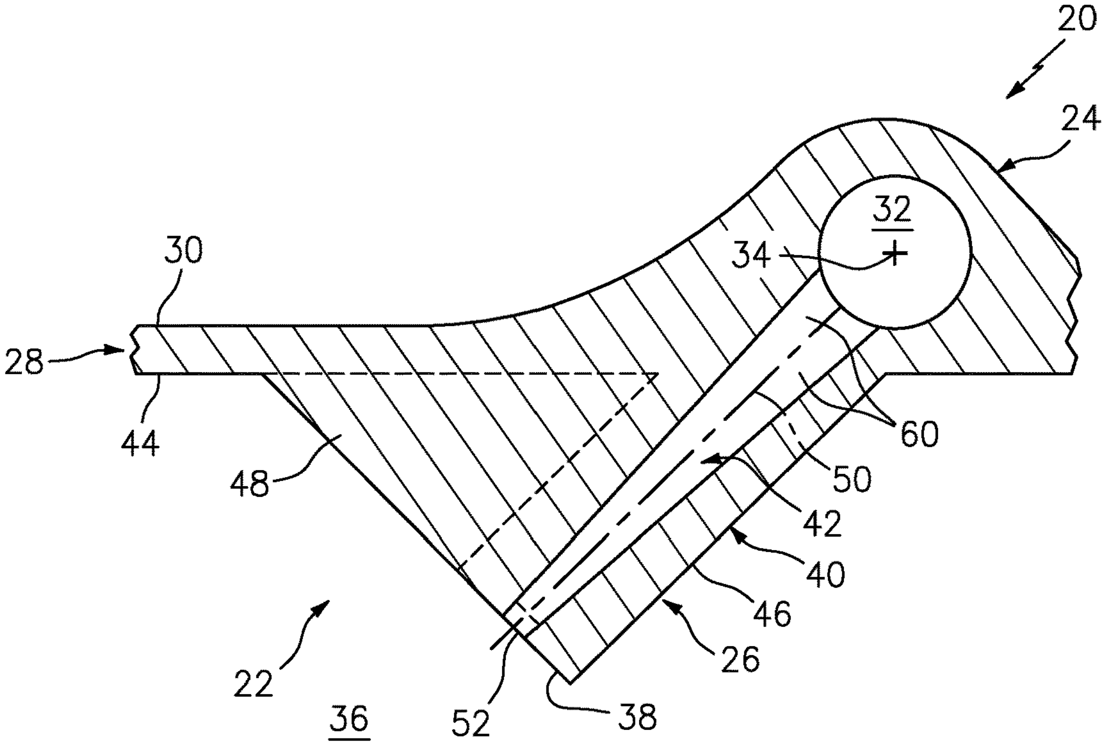
FIGS. 2 and 3 are side sectional illustrations of portion of the turbine engine apparatus through the fuel nozzle.

Referring to FIG. 2, the fuel nozzle 26 is configured to receive (e.g., liquid) fuel from the fuel conduit 24, and inject that received fuel into a plenum 36 (e.g., a fluid passage such as an air passage) at a distal end 38 (e.g., tip) of the fuel nozzle 26. The fuel nozzle 26 of FIG. 2 includes a nozzle body 40 and a nozzle passage 42; e.g., a fuel passage.

The nozzle body 40 is arranged at and/or is connected to a second side 44 (e.g., an interior and/or inner side) of the apparatus base 28, where the base second side 44 is opposite the base first side 30. The nozzle body 40 of FIG. 2 includes a nozzle tube 46 and a nozzle support structure 48; e.g., a web. A base end of the nozzle tube 46 is connected to the apparatus base 28. The nozzle tube 46 projects longitudinally out from the apparatus base 28 along a (e.g., straight and/or curved) longitudinal centerline 50 of the nozzle passage 42 and/or the nozzle tube 46 to the fuel nozzle distal end 38. The nozzle support structure 48 is connected to and extends between the apparatus base 28 and a (e.g., upstream) side of the nozzle tube 46. The nozzle support structure 48 structurally ties the nozzle tube 46 to the apparatus base 28 and may thereby support the nozzle tube 46 within the plenum 36. The nozzle support structure 48, for example, may form a support gusset for the nozzle tube 46.

An internal bore of the nozzle tube 46 at least partially (or completely) forms the nozzle passage 42. The nozzle passage 42 extends longitudinally along the longitudinal centerline 50 within and/or through the apparatus base 28 and the nozzle tube 46 from the supply passage 32 to a downstream nozzle orifice 52 at the fuel nozzle distal end 38. This nozzle orifice 52 provides an outlet from the nozzle passage 42 and, more generally, the fuel nozzle 26.

Figure 3:
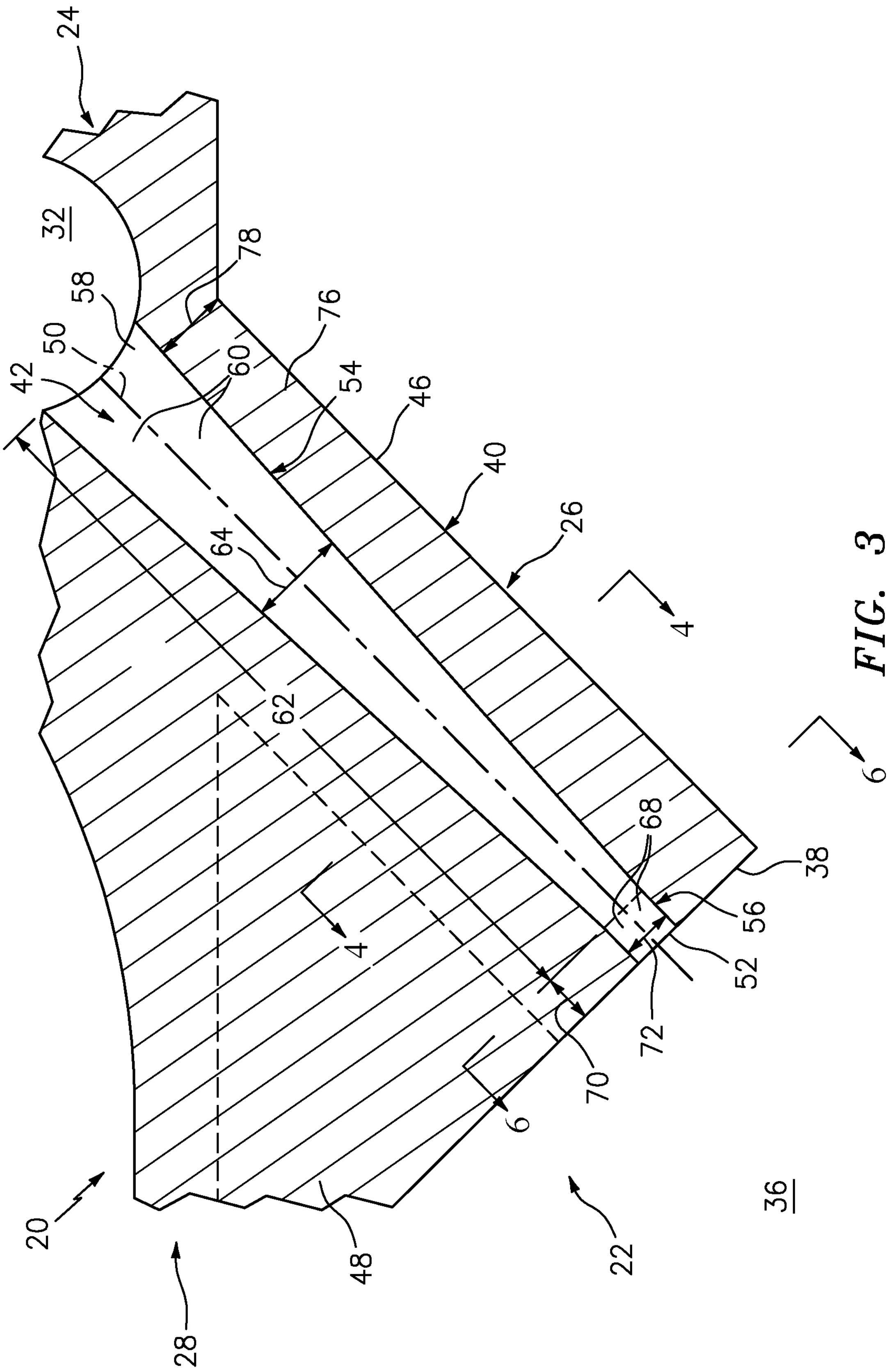

Referring to FIG. 3, the nozzle passage 42 includes one or more different flow portions (e.g., 54 and 56) arranged longitudinally along the longitudinal centerline 50. The nozzle passage 42 of FIG. 3, for example, includes a (e.g., upstream) convergent portion 54 and a (e.g., downstream) throat portion 56.

The convergent portion 54 is upstream of the throat portion 56, for example at (e.g., on, adjacent or proximate) an upstream end 58 of the nozzle passage 42. The convergent portion 54 of FIG. 3, for example, is formed by one or more tapering convergent sidewall surfaces 60; see also FIG. 4. These convergent sidewall surfaces 60 and, thus, the convergent portion 54 extend longitudinally along the longitudinal centerline 50 from the supply passage 32 to the throat portion 56, thereby defining a longitudinal length 62 of the convergent portion 54.

A lateral width 64 (e.g., a diagonal axis) of the convergent portion 54 (e.g., continuously) decreases as the nozzle passage 42 extends longitudinally along the longitudinal centerline 50 towards the throat portion 56/the nozzle orifice 52. The convergent portion lateral width 64 at the nozzle passage upstream end 58 is greater than the convergent portion lateral width 64 at the throat portion 56.

Figure 4:
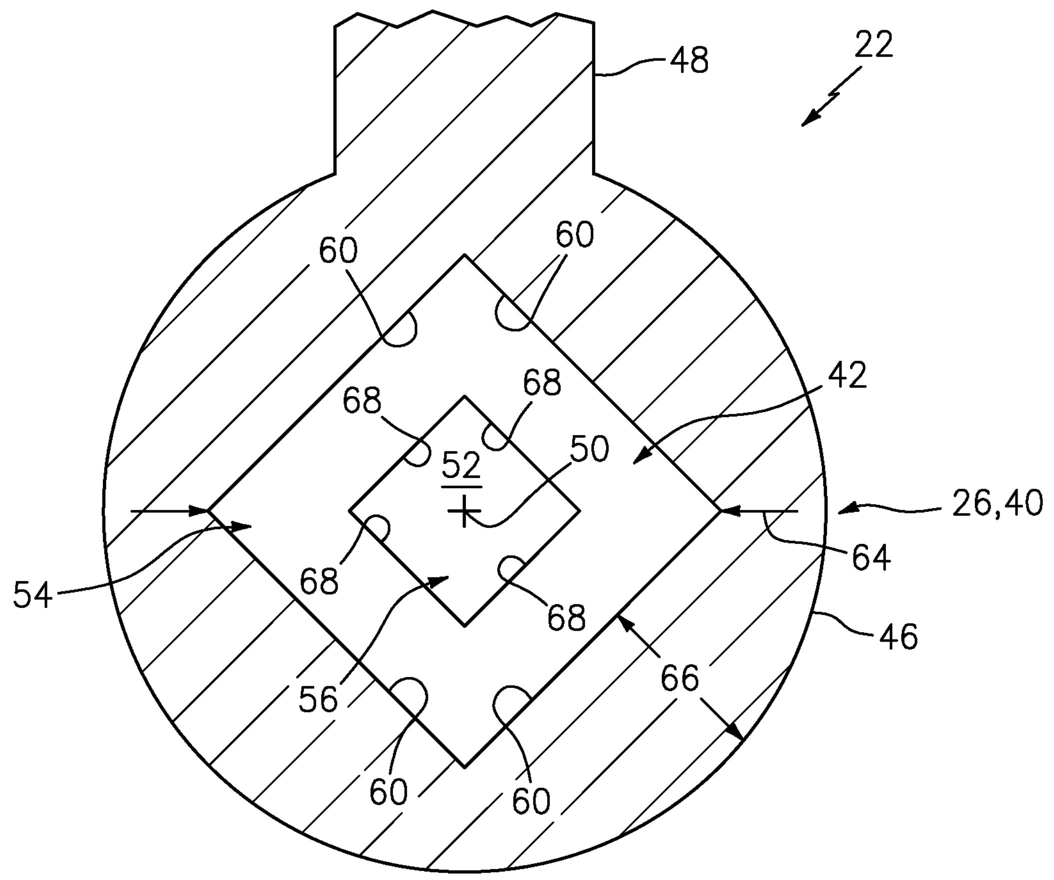
FIG. 4 is a cross-sectional illustration of a portion of the fuel nozzle taken along line 4-4 in FIG. 3.
Figure 5:
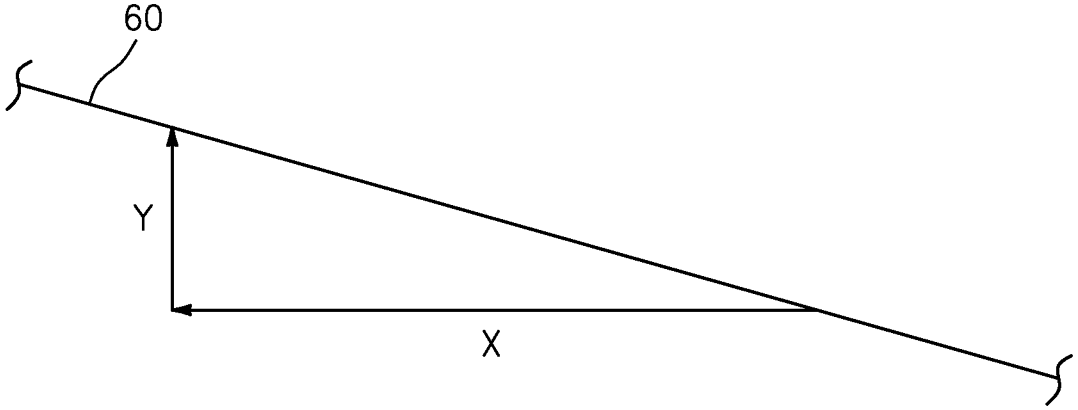
FIG. 5 is a graphic representation of a segment of an internal surface of the fuel nozzle at least partially forming a nozzle passage within the fuel nozzle.

A slope of a taper of the convergent portion 54 and its tapering convergent sidewall surfaces 60 has a rise to run ratio (Y/X; see FIG. 5). This convergent portion rise to run ratio may be equal to or less than about (e.g., +/−1%) or exactly 0.6 (e.g., ≤0.577), for example, to minimize head loss due to contraction. For example, referring to FIG. 5, for every five (5) units the convergent portion 54 and its tapering convergent sidewall surfaces 60 extend longitudinally along the longitudinal centerline 50 (the run X), the convergent portion 54 and its tapering convergent sidewall surfaces 60 may extend laterally (e.g., in a direction perpendicular to the longitudinal centerline 50) three (3) units (the rise Y). Such a convergent portion rise to run ratio may facilitate in the additive manufacturing of the fuel nozzle 26, for example, by minimizing layer-to-layer overhangs and/or minimizing variation in lateral sidewall thickness 66 (see FIG. 4) of the nozzle tube 46. The present disclosure, however, is not limited to such an exemplary convergent portion rise to run ratio nor to any particular manufacturing techniques. For example, in some embodiments, the rise to run ratio may be equal to or less than 0.5, 0.4, 0.3, etc. In other embodiments, the rise to run ratio may be greater than 0.6, but less than 1 for example.

Referring to FIG. 3, the throat portion 56 is downstream of the convergent portion 54, for example at (e.g., on, adjacent or proximate) the fuel nozzle distal end 38. A downstream most end of the throat portion 56 may also define the nozzle orifice 52. The throat portion 56 of FIG. 3, for example, is formed by one or more (e.g., non-tapered) throat sidewall surfaces 68 (see also FIG. 6). These throat sidewall surfaces 68 and, thus, the throat portion 56 extend longitudinally along the longitudinal centerline 50 from the convergent portion 54 to (or towards) the nozzle orifice 52 in the fuel nozzle distal end 38, thereby defining a longitudinal length 70 of the throat portion 56.

The throat portion longitudinal length 70 may be different (e.g., less) than the convergent portion longitudinal length 62. The convergent portion longitudinal length 62, for example, may be more than two times (2×), five times (5×) or ten times (10×) the throat portion longitudinal length 70. The present disclosure, however, is not limited to the foregoing dimensional relationship between the lengths.

Figure 6:
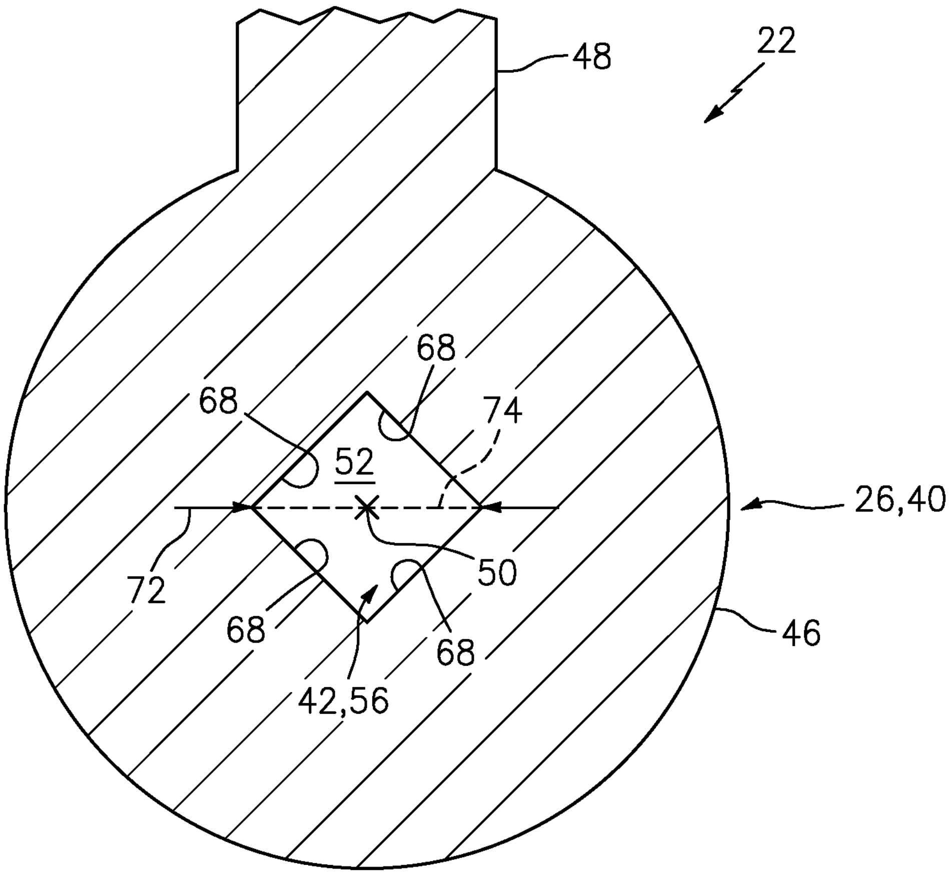
FIG. 6 is a cross-sectional illustration of a portion of the fuel nozzle taken along line 6-6 in FIG. 3.

A lateral width 72 (e.g., a diagonal axis 74 as shown in FIG. 6) of the throat portion 56 may be about (e.g., +/−1%) or exactly constant as the nozzle passage 42 extends longitudinally along the longitudinal centerline 50 towards the nozzle orifice 52. The throat portion lateral width 72 at the convergent portion 54 is equal to the throat portion lateral width 72 at the nozzle orifice 52. Thus, the throat portion 56 is non-tapered.

Referring to FIGS. 4 and 6, one or more portion of the nozzle passage 42 may have a solid (e.g., non-annular) non-circular cross-sectional geometry (or other non-circular cross-sectional geometry), for example, when viewed in a plane perpendicular to the longitudinal centerline 50. For example, each nozzle passage portion 54, 56 and, thus, an entirety of the nozzle passage 42 of FIGS. 3, 4 and 6 has the (e.g., same) polygonal cross-sectional geometry. This polygonal cross-sectional geometry may be square shaped and/or diamond shaped as shown in FIGS. 4 and 6. The present disclosure, however, is not limited to such exemplary polygonal shapes. For example, in other embodiments, the polygonal cross-sectional geometry may have a triangular shape or any other polygonal shape.

Figure 7:
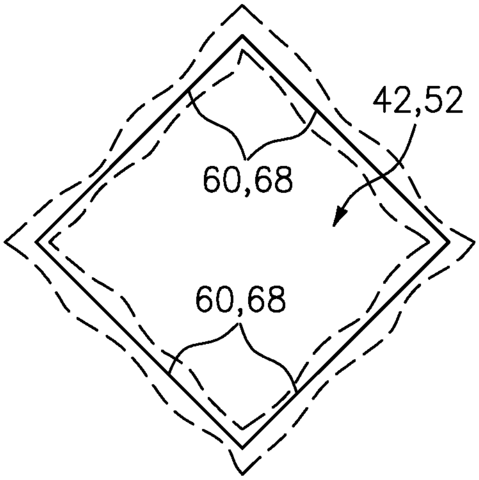
FIG. 7 is a schematic representation of deviation in an additively manufactured, as-formed fuel nozzle internal surface from a standard.
Figure 8:
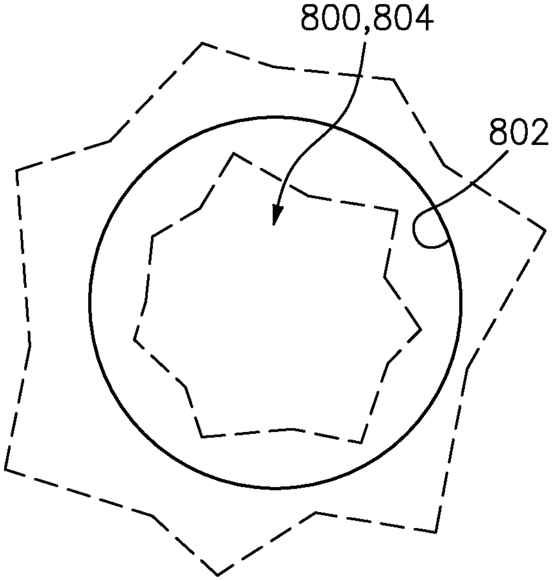
FIG. 8 is a schematic representation of deviation in another additively manufactured, as-formed fuel nozzle internal surface from another standard.

Compared to a circular cross-sectional geometry for example, the polygonal cross-sectional geometry may aid in minimizing variation in as-formed surface finish (e.g., surface roughness and/or surface distortions) of the nozzle passage surfaces 60, 68, particularly where the fuel nozzle 26 is additively manufactured and/or the nozzle passage lateral width (e.g., 64, 72; see FIG. 3) is relatively small. Configuring the nozzle passage 42 with the polygonal cross-sectional geometry may thereby reduce actual (e.g., additively manufactured, as-formed) dimensional and/or geometric deviation of the nozzle passage 42 and its nozzle orifice 52 from a (e.g., design) standard as schematically shown, for example, in FIG. 7. By contrast, referring to FIG. 8, layer-to-layer distortions produced during additive manufacturing may leave a nozzle passage 800 designed to have a circular cross-sectional geometry with a relative rough and/or otherwise distorted nozzle passage surface 802. Such distortions may increase actual dimensional and/or geometric deviation of the circular nozzle passage 800 from its (e.g., design) standard. This increase in deviation particularly at a nozzle orifice 804 may reduce fuel metering precision through the circular nozzle orifice 804. Furthermore, where a turbine engine includes multiple fuel nozzles with the circular nozzle orifice 804, there may be a relatively significant deviation between the fuel injected by the fuel nozzles and, thus, a relatively high imbalance in fuel burn and hot streaks within the combustion chamber as well as downstream in the turbine section. However, by reducing the as-formed deviation as schematically shown in FIG. 7 by designing/providing the nozzle passage 42 and/or the nozzle orifice 52 with the polygonal cross-sectional geometry (or another non-circular cross-sectional geometry), fuel metering precision of the fuel nozzle 26 can be increased. Deviation between multiple fuel nozzles 26 can also be reduced and, thus, fuel burn and/or hot streak imbalance may also be reduced.

Referring to FIGS. 4 and 6, by reducing surface finish variation of the nozzle passage surfaces 60, 68, the fuel nozzle 26 may be designed with relatively small dimensions while still being producible via various manufacturing techniques including additive manufacturing. For example, the nozzle orifice 52 of FIG. 6 is configured with a (e.g., minimum or maximum) lateral width (e.g., the lateral width 72) which may be equal to or less than about (e.g., +/−1%) or exactly 0.0223 inches (0.0566 centimeters); e.g., ≤0.019 inches (0.0483 centimeters). In addition or alternatively, referring to FIG. 3, a tubular sidewall 76 of the nozzle tube 46 may have a (e.g., minimum, smallest) lateral thickness 78 equal to or less than about (e.g., +/−1%) or exactly 0.010 inches (0.0254 centimeters). Note, at such relatively small dimensions for the nozzle orifice 52 and/or the tubular sidewall 76, normally micro-issues in additive manufacturing may become macro-issues and poor melting exhibited by unsupported features (e.g., faces) may cause blockages. However, reducing the surface finish variation as described above may mitigate or prevent formation of such blockages. The present disclosure, of course, is not limited to the foregoing exemplary fuel nozzle dimensions nor to any particular manufacturing technique.

Referring to FIG. 2, during turbine engine operation, (e.g., liquid) fuel is directed into the supply passage 32 from a fuel source (not shown). At least a portion (or all) of the fuel within the supply passage 32 is directed into the nozzle passage 42. This fuel flows through the nozzle passage 42 and out of the fuel nozzle 26 through the nozzle orifice 52 and into the plenum 36. The fuel within the plenum 36 may be mixed with air (e.g., compressed air) for subsequent combustion.

Figure 9:
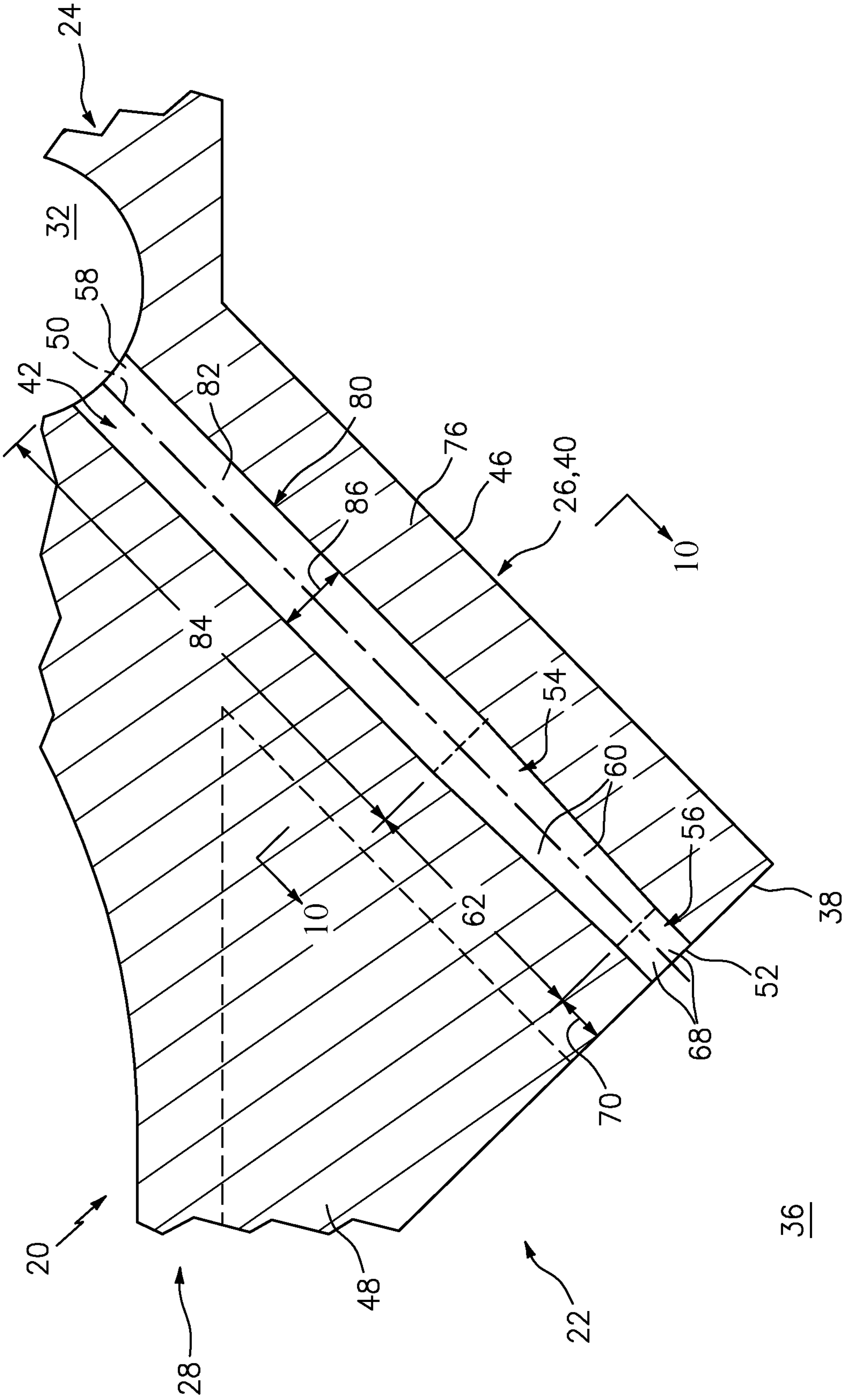
FIG. 9 is a side sectional illustration of a portion of the turbine engine apparatus through the fuel nozzle with another nozzle passage configuration.

In some embodiments, referring to FIG. 9, the nozzle passage 42 may also be configured with a flow channel portion 80. This flow channel portion 80 is upstream of the convergent portion 54, for example at (e.g., on, adjacent or proximate) the nozzle passage upstream end 58. The flow channel portion 80 of FIG. 9, for example, is formed by at least one (e.g., non-tapering, cylindrical) flow channel sidewall surface 82. This flow channel sidewall surface 82 and, thus, the flow channel portion 80 extend longitudinally along the longitudinal centerline 50 from the supply passage 32 to the convergent portion 54, thereby defining a longitudinal length 84 of the flow channel portion 80.

The flow channel portion longitudinal length 84 may be different (e.g., greater) than the convergent portion longitudinal length 62. The convergent portion longitudinal length 62, for example, may be less than the flow channel portion longitudinal length 84 but greater than fifteen percent (15%) of the flow channel portion longitudinal length 84. More particularly, the convergent portion longitudinal length 62 may be between twenty-five percent (25%) and seventy-five percent (75%) of the flow channel portion longitudinal length 84. The present disclosure, however, is not limited to the foregoing dimensional relationship between the lengths 62 and 84. For example, in other embodiments, the convergent portion longitudinal length 62 may be equal to or greater than the flow channel portion longitudinal length 84.

A lateral width 86 (e.g., a diameter) of the flow channel portion 80 may be about (e.g., +/−1%) or exactly constant as the nozzle passage 42 extends longitudinally along the longitudinal centerline 50 towards the throat portion 56/the nozzle orifice 52. The flow channel portion lateral width 86 at the nozzle passage upstream end 58 is equal to the flow channel portion lateral width 86 at the convergent portion 54. Thus, the flow channel portion 80 is non-tapered.

Figure 10:
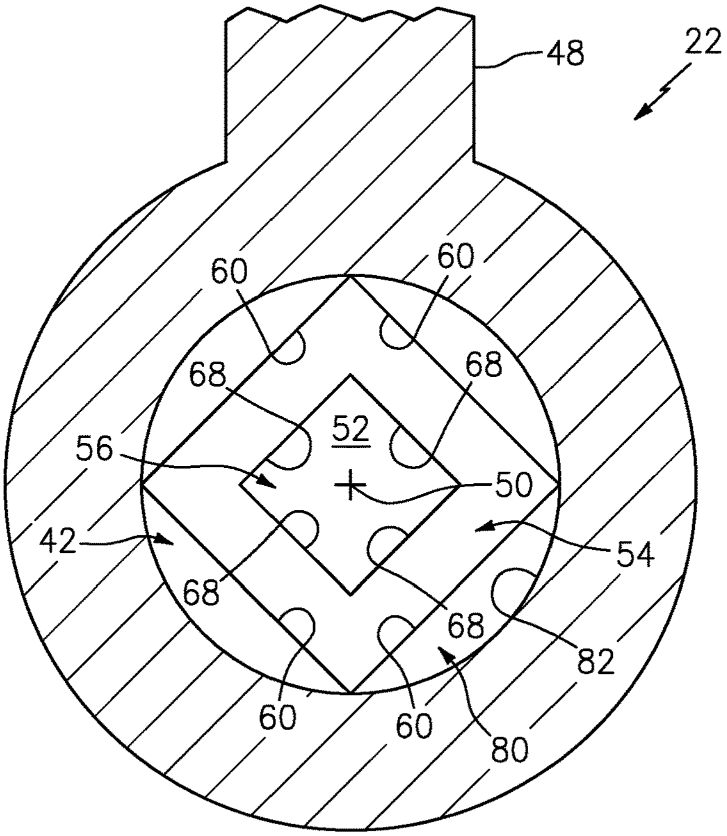
FIG. 10 is a cross-sectional illustration of a portion of the fuel nozzle taken along line 10-10 in FIG. 9.

In some embodiments, referring to FIG. 9, one portion of the nozzle passage 42 may have a different cross-sectional geometry than another portion of the nozzle passage 42, for example, when viewed in respective planes perpendicular to the longitudinal centerline 50. The throat portion 56 and at least an adjacent section of the convergent portion 54 of FIG. 9, for example, may each be configured with the (e.g., same) solid polygonal cross-sectional geometry (see FIGS. 4 and 6). By contrast, the flow channel portion 80 and at least an adjacent section of the convergent portion 54 of FIG. 9 may be configured with a different cross-sectional geometry (see FIG. 10); e.g., a solid (e.g., non-annular) circular cross-sectional geometry or another solid (e.g., non-annular) polygonal, elongated (e.g., oval) or other cross-sectional geometry. Of course, in other embodiments, each of the nozzle passage portions 54, 56 and 80 may be configured with the (e.g., same) solid polygonal cross-sectional geometry.

Figure 11:
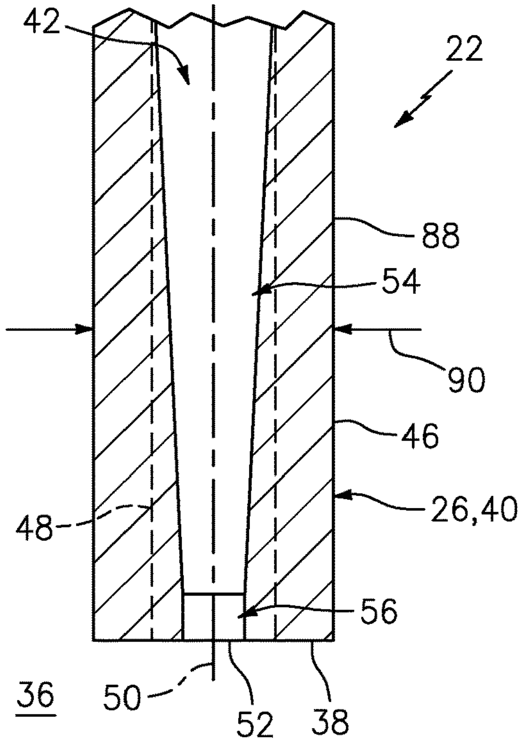
FIG. 11 is a sectional illustration of a portion of the fuel nozzle configured with a non-tapered exterior.

In some embodiments, referring to FIG. 11, at least a portion (or an entirety) of an exterior 88 of the fuel nozzle 26 and its nozzle tube 46 may have a constant lateral width 90 as the exterior 88 extends longitudinally along the longitudinal centerline 50, for example, from the apparatus base 28 (see FIG. 2) to (or towards) the fuel nozzle distal end 38/the nozzle orifice 52. This at least a portion (or the entirety) of the exterior 88 may (e.g., partially or completely) longitudinally overlap any one or more of the nozzle passage portions (e.g., 54, 56 and/or 80; 80 not shown in FIG. 11) along the longitudinal centerline 50.

Figure 12:
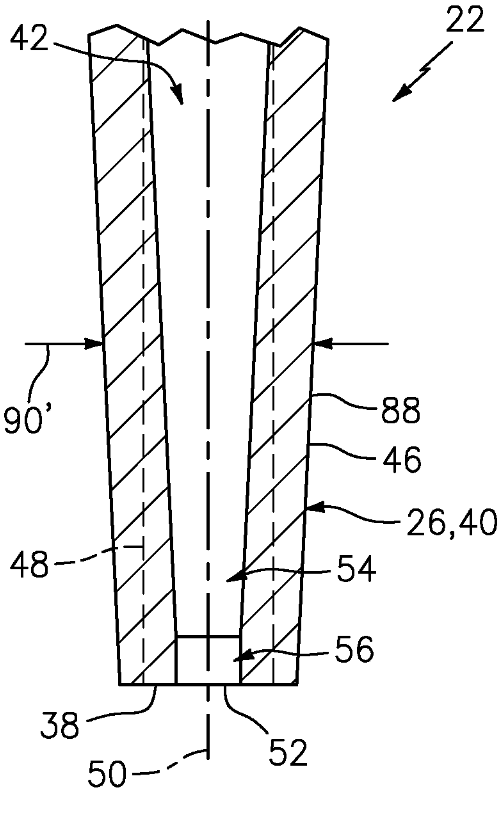
FIG. 12 is a sectional illustration of a portion of the fuel nozzle configured with a tapered exterior.

In some embodiments, referring to FIG. 12, at least a portion (or the entirety) of the exterior 88 of the fuel nozzle 26 and its nozzle tube 46 may have a variable lateral width 90'. The exterior 88 of FIG. 12, for example, laterally tapers inward towards the longitudinal centerline 50 as the exterior 88 extends longitudinally along the longitudinal centerline 50, for example, from the apparatus base 28 (see FIG. 2) to (or towards) the fuel nozzle distal end 38/the nozzle orifice 52. This at least a portion (or the entirety) of the exterior 88 may (e.g., partially or completely) longitudinally overlap any one or more of the nozzle passage portions (e.g., 54, 56 and/or 80; 80 not shown in FIG. 11) along the longitudinal centerline 50.

Figure 13:
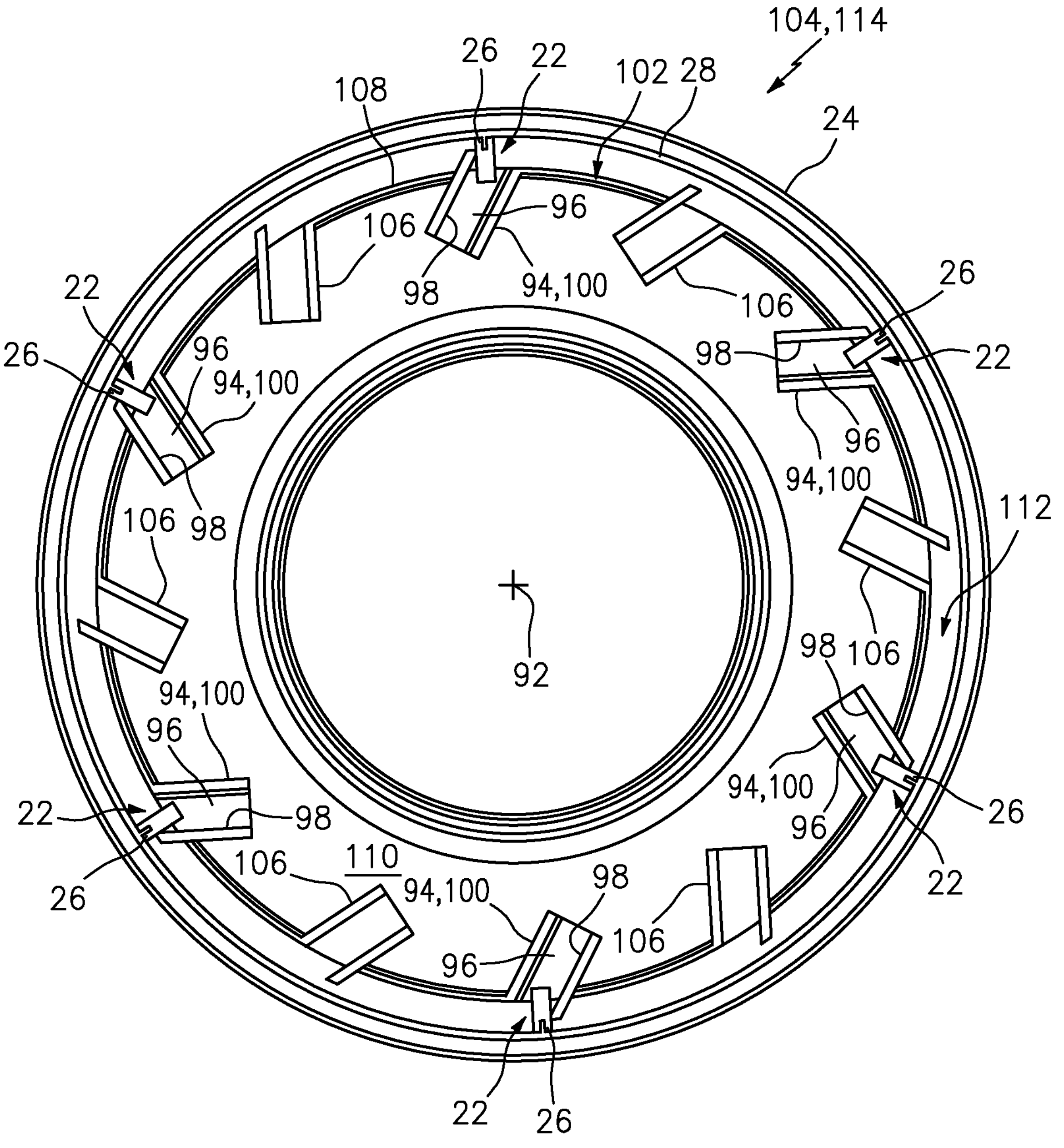
FIG. 13 is a cross-sectional illustration of a combustor section.

In some embodiments, referring to FIG. 13, the fuel nozzle 26 may be one of a plurality of fuel nozzles 26 connected to the apparatus base 28 and fluidly coupled with the fuel conduit 24. These fuel nozzles 26 may be arranged circumferentially about a centerline/rotational axis 92 of the turbine engine in an annular array.

In some embodiments, the turbine engine apparatus 20 may also include one or more fuel vaporizers 94. Each fuel nozzle 26 is arranged with a respective one of the fuel vaporizers 94. More particularly, each fuel nozzle 26 projects into a respective one of the fuel vaporizers 94 and is arranged within a fluid passage 96 (e.g., an air passage; the plenum 36 in FIGS. 1-3) of the respective fuel vaporizer 94. With such an arrangement, each fuel nozzle 26 may direct at least a portion of the fuel injected into the fluid passage 96 against a (e.g., tubular) surface 98 of the respective fuel vaporizer 94. The fuel vaporizer 94 may at least partially vaporize the fuel impinging against its surface 98.

In the specific embodiment of FIG. 13, each fuel vaporizer 94 is configured as a structure such as a flow tube 100 (e.g., a fluid tube, an air tube) for a combustor 102 in the combustor section 104. Note, the combustor 102 may also include at least one flow tube 106 in between, for example, each circumferentially neighboring set of the vaporizers 94. Each of the flow tubes 100, 106 is connected to and projects out from a wall 108 of the combustor 102 and into a (e.g., annular) combustion chamber 110 at least partially defined by the combustor wall 108. The fluid passage 96 (e.g., air passage) of each flow tube 100 is configured to receive fluid and, more particularly, compressed air from a compressor section of the turbine engine (not visible in FIG. 13) through another plenum 112. This compressed air is directed through the respective fluid passage 96 and into the combustion chamber 110. However, before reaching the combustion chamber 110, the air within the respective fluid passage 96 is mixed with fuel injected by a respective one of the fuel nozzles 26. By injecting the fuel within the flow tube 100, the fuel may be more likely to vaporize within the respective fluid passage 96; e.g., upon mixing with the airflow and/or upon impinging against the surface 98 (e.g., an inner side wall surface of the flow tube 100).

In some embodiments, still referring to FIG. 13 (see also FIG. 2), at least the apparatus base 28, the fuel conduit 24 and each fuel nozzle 26 may be configured together in an integral, monolithic body. The turbine engine apparatus 20 and its elements 24, 26 and 28, for example, may be additively manufactured in a layer-by-layer build process. Referring to FIG. 2, the additive manufacturing may be performed to (e.g., completely) form each nozzle passage 42 and its associated nozzle orifice 52, for example, without any additional machining (e.g., drilling of the nozzle elements 42 and/or 52). The present disclosure, however, is not limited to such an exemplary monolithic construction nor to additive manufacturing. For example, in other embodiments, one or more or all of the apparatus elements 24, 26 and/or 28 and/or portions thereof may be individually formed (e.g., additively manufactured, cast, machined and/or formed via any other suitable technique) and subsequently connected (e.g., fastener and/or bonded) together.

The term additive manufacturing may describe a process where a component or components are formed by accumulating and/or fusing material together using an additive manufacturing device, typically in a layer-on-layer manner. Layers of powder material, for example, may be disposed and thereafter solidified sequentially onto one another to form the component(s). The term solidify may describe a process whereby material is sintered and/or otherwise melted thereby causing discrete particles or droplets of the sintered and/or melted material to fuse together. Examples of the additive manufacturing process include a laser powder bed fusion (LPBF) process and an electron beam powder bed fusion (EB-PBF) process. Examples of the additive manufacturing device include a laser powder bed fusion (LPBF) device and an electron beam powder bed fusion (EB-PBF) device. Of course, various other additive manufacturing processes and devices are known in the art, and the present disclosure is not limited to any particular ones thereof.

Figure 14:
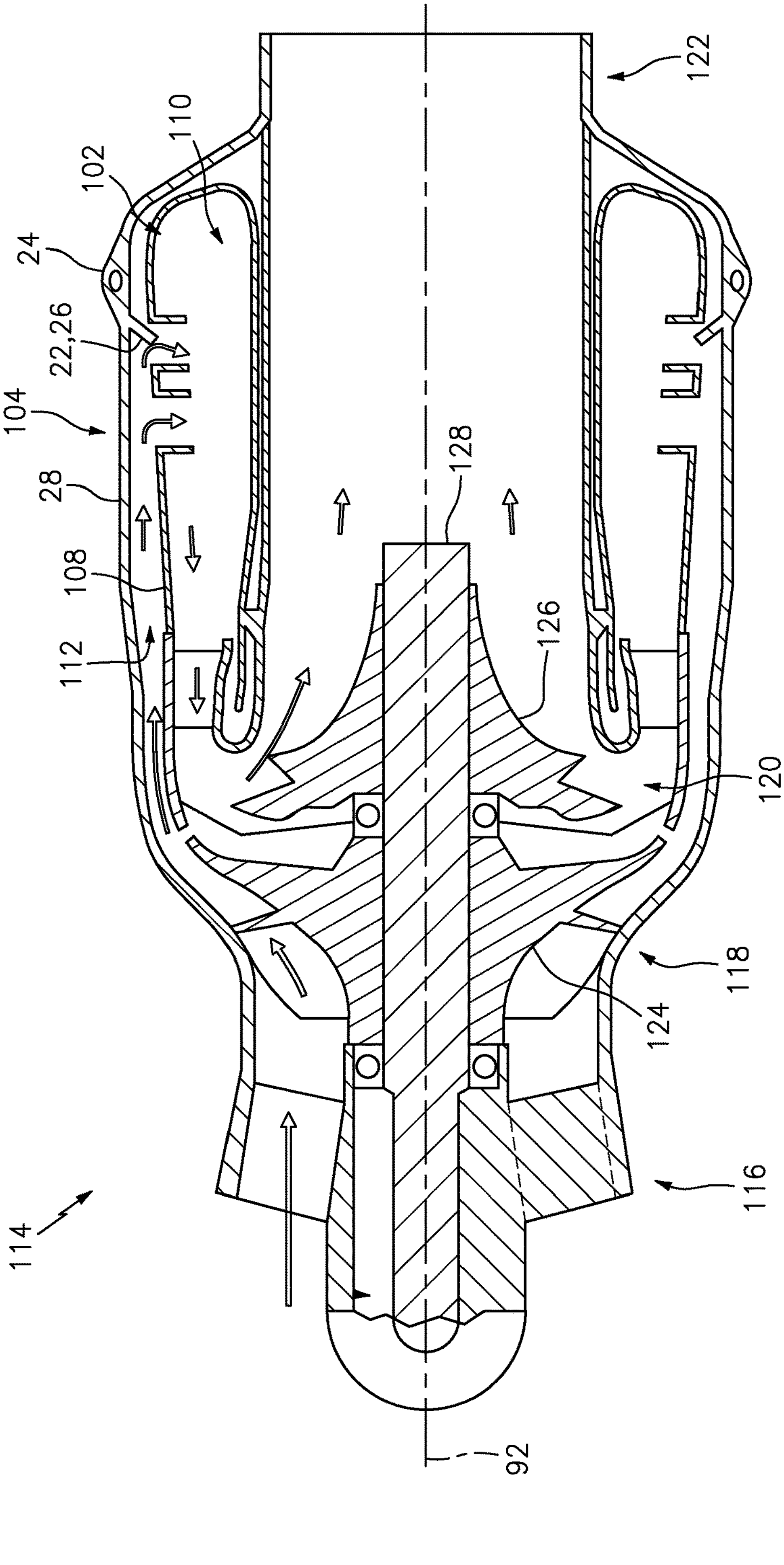
FIG. 14 is a schematic side illustration of a single spool, radial flow turbojet turbine engine.

The turbine engine apparatus 20 of the present disclosure may be configured with various different types and configurations of turbine engines. FIG. 14 illustrates one such type and configuration of the turbine engine—a single spool, radial-flow turbojet turbine engine 114. This gas turbine engine 114 is configured for propelling an aircraft such as, but not limited to, an unmanned aerial vehicle (UAV), a drone or any other manned or unmanned aircraft or self-propelled projectile. The present disclosure, however, is not limited to such an exemplary turbojet turbine engine configuration nor to an aircraft propulsion system application.

For example, the gas turbine engine may alternatively be configured as an auxiliary power unit (APU) or an industrial gas turbine engine.

In the specific embodiment of FIG. 14, the turbine engine 114 includes an upstream inlet 116, a (e.g., radial) compressor section 118, the combustor section 104, a (e.g., radial) turbine section 120 and a downstream exhaust 122 fluidly coupled in series. A compressor rotor 124 in the compressor section 118 is coupled with a turbine rotor 126 in the turbine section 120 by a shaft 128, which shaft 128 rotates about the centerline/rotational axis 92 of the turbine engine 114.

The turbine engine apparatus 20 may be included in various turbine engines other than the one described above. The turbine engine apparatus 20, for example, may be included in a geared turbine engine where a gear train connects one or more shafts to one or more rotors in a fan section, a compressor section and/or any other engine section. Alternatively, the turbine engine apparatus 20 may be included in a turbine engine configured without a gear train. The turbine engine apparatus 20 may be included in a geared or non-geared turbine engine configured with a single spool (e.g., see FIG. 14), with two spools, or with more than two spools. The turbine engine may be configured as a turbofan engine, a turbojet engine, a propfan engine, a pusher fan engine or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:

a fuel conduit comprising a fuel supply passage;

a combustor wall at least partially forming a combustion chamber:

a fuel nozzle fluidly coupled with the fuel conduit, the fuel nozzle comprising a nozzle body, a nozzle passage and a nozzle orifice; and an apparatus base supporting at least one of the fuel conduit or the fuel nozzle;

the nozzle passage extending longitudinally along a centerline of the nozzle passage within the fuel nozzle to the nozzle orifice, the centerline of the nozzle passage angularly offset from a centerline of the fuel supply passage, and the apparatus base being longitudinally spaced apart from the combustor wall relative to the centerline of the nozzle passage;

the nozzle passage having a solid polygonal cross-sectional geometry at the nozzle orifice;

a first portion of the nozzle passage including convergent sidewall surfaces, the first portion tapering inward towards the centerline of the nozzle passage as the nozzle passage extends longitudinally along the centerline of the nozzle passage, the first portion extending from the fuel supply passage to a second portion of the nozzle passage, and wherein a slope of the taper has a rise to run ratio equal to or less than 0.6; and the second portion of the nozzle passage extending longitudinally along the centerline of the nozzle passage from the first portion of the nozzle passage to the nozzle orifice, and the second portion of the nozzle passage having a constant lateral width as the second portion of the nozzle passage extends longitudinally along the centerline of the nozzle passage from the first portion of the nozzle passage to the nozzle orifice; and an air tube extending into the combustion chamber from the combustor wall and comprising an air passage;

the nozzle body extending radially relative to the centerline of the fuel supply passage and projecting into the air passage to a distal end of the nozzle body, the nozzle body including a nozzle tube and a nozzle support gusset, the nozzle tube including an internal bore forming the nozzle passage, the nozzle support gusset connecting to and extending between the apparatus base and the nozzle tube, and the centerline of the nozzle passage angularly offset from a centerline of the air tube; and the fuel nozzle configured to direct fuel out of the nozzle passage through the nozzle orifice into the air passage.

2. The apparatus of claim 1, wherein the solid polygonal cross-sectional geometry has a diamond shape.

3. The apparatus of claim 1, wherein the solid polygonal cross-sectional geometry has a square shape.

4. The apparatus of claim 1, wherein at least a first portion of the nozzle tube has a constant lateral width as the nozzle tube extends longitudinally along the centerline of the nozzle passage towards the nozzle orifice; and the first portion of the nozzle tube longitudinally overlaps the first portion of the nozzle passage along the centerline of the nozzle passage.

5. The apparatus of claim 1, wherein the first portion of the nozzle passage and the second portion of the nozzle passage each have the solid polygonal cross-sectional geometry.

6. The apparatus of claim 1, wherein the solid polygonal cross-sectional geometry extends along a longitudinal length of the nozzle passage.

7. The apparatus of claim 1, wherein the nozzle orifice has a lateral width less than 0.0233 inches.

8. The apparatus of claim 1, wherein the fuel nozzle has a tubular sidewall forming the nozzle passage; and the tubular sidewall has a minimum lateral width that is less than 0.01 inches.

9. The apparatus of claim 1, wherein the fuel nozzle is configured to receive fuel from the fuel conduit within the nozzle passage, and the fuel nozzle is further configured to direct the fuel out of the nozzle passage through the nozzle orifice.

10. The apparatus of claim 1, wherein the air tube is connected to the combustor wall and projecting into the combustion chamber.

11. The apparatus of claim 1, wherein the centerline of the nozzle passage is angularly offset from the centerline of the air tube when viewed in a reference plane parallel with and including the centerline of the air tube.

12. The apparatus of claim 1, wherein the centerline of the nozzle passage is angularly offset from the centerline of the air tube when viewed in a reference plane parallel with and including the centerline of the nozzle passage.

13. The apparatus of claim 1, wherein the centerline of the nozzle passage is angularly offset from the centerline of the air tube when viewed in a reference plane perpendicular to a centerline of the turbine engine.

14. The apparatus of claim 1, wherein the fuel nozzle is further configured to direct at least a portion of the fuel against a surface of the air tube.

15. The apparatus of claim 1, wherein the rise to run ratio is equal to 0.6.

16. An apparatus for a turbine engine, comprising:

a combustor wall at least partially forming a combustion chamber;

a fuel conduit including a fuel conduit centerline extending circumferentially about a centerline of the turbine engine when viewed in a cross-sectional reference plane of the turbine engine orthogonal to the centerline of the turbine engine;

a plurality of fuel nozzles arranged circumferentially about the centerline of the turbine engine, each of the plurality of fuel nozzles fluidly coupled with the fuel conduit, the plurality of fuel nozzles comprising a first fuel nozzle, the first fuel nozzle comprising a nozzle tube, a nozzle support gusset, a nozzle passage and a nozzle orifice, the first fuel nozzle configured to receive fuel from the fuel conduit within the nozzle passage, the nozzle tube extending from the fuel conduit to the nozzle orifice at a distal end of the nozzle tube, and the first fuel nozzle configured to direct the fuel out of the nozzle passage through the nozzle orifice;

an apparatus base radially spaced apart from the combustor wall relative to the centerline of the turbine engine and supporting the fuel conduit and the first fuel nozzle; and an air tube comprising an air passage, the air tube extending radially along a central axis from the combustor wall into the combustion chamber when viewed in a second reference plane parallel with and including the centerline of the turbine engine, and the nozzle tube extending radially relative to the fuel conduit centerline into the air passage to the nozzle orifice;

the nozzle support gusset extending between the apparatus base and the nozzle tube:

the nozzle passage extending longitudinally along a centerline of the nozzle passage from the fuel conduit, through the first fuel nozzle, to the nozzle orifice when viewed in the second reference plane parallel with and including the centerline of the turbine engine, and the centerline of the nozzle passage angularly offset from the centerline of the turbine engine when viewed in the second reference plane parallel with and including the centerline of the turbine engine such that the nozzle tube extends upstream towards a compressor section of the turbine engine; and the nozzle passage having a solid polygonal cross-sectional geometry as the nozzle passage extends longitudinally along the centerline of the nozzle passage from the fuel conduit to the nozzle orifice.

17. An apparatus for a turbine engine, comprising:

a fuel conduit comprising a fuel supply passage;

a fuel nozzle fluidly coupled with the fuel conduit, the fuel nozzle comprising a nozzle support gusset, a nozzle passage and a nozzle orifice, the fuel nozzle extending along a nozzle tube from the fuel conduit to a distal end of the fuel nozzle, and the nozzle passage extending longitudinally along a centerline within the fuel nozzle to the nozzle orifice;

an apparatus base supporting the fuel conduit and the fuel nozzle;

an air tube including an air passage, the nozzle tube projecting into the air passage to the distal end; and a combustor wall at least partially forming a combustion chamber, the air tube connected to the combustor wall and projecting radially from the combustor wall into the combustion chamber relative to a centerline of the turbine engine, and the combustor wall being radially spaced apart from the apparatus base relative to the centerline of the turbine engine;

wherein the nozzle passage has a solid polygonal cross-sectional geometry at the nozzle orifice and the fuel nozzle is configured to direct fuel out of the nozzle passage through the nozzle orifice into the air passage;

wherein the nozzle support gusset extends between the apparatus base and an upstream side of the nozzle tube:

wherein a first portion of the nozzle passage includes convergent sidewall surfaces tapering inward towards the centerline of the nozzle passage as the nozzle passage extends longitudinally along the centerline of the nozzle passage, and a slope of the convergent sidewall surfaces has a rise to run ratio equal to about 0.6; wherein the fuel nozzle is configured to direct at least a portion of the fuel against a surface of the air tube; and wherein the centerline of the fuel nozzle is angularly offset from a centerline of the air tube when viewed in a reference plane perpendicular to the centerline of the turbine engine.

* * * * *